United States Patent [19]

Heffelfinger

[11] 4,124,019

[45] Nov. 7, 1978

[54] TUBULAR SOLAR COLLECTOR

[75] Inventor: Richard H. Heffelfinger, Berwyn, Pa.

[73] Assignee: General Electric Company, Fairfield, Conn.

[21] Appl. No.: 727,158

[22] Filed: Sep. 27, 1976

[51] Int. Cl.² ............................................. F24J 3/02
[52] U.S. Cl. ................................... 126/271; 126/270; 138/113; 165/76; 165/162; 165/178; 165/183
[58] Field of Search .............. 126/270, 271; 237/1 A; 138/38, 106, 107, 113; 165/76, 162, 178, 183

[56] References Cited

U.S. PATENT DOCUMENTS

| 980,505   | 1/1911  | Emmet      | 126/271 |
| 1,345,758 | 7/1920  | Folsom     | 126/271 |
| 3,227,153 | 1/1966  | Godel et al. | 126/271 |
| 3,974,824 | 8/1976  | Smith      | 126/271 |
| 3,983,861 | 10/1976 | Beauchaine | 126/271 |
| 4,002,160 | 1/1977  | Mather, Jr. | 126/271 |
| 4,026,273 | 5/1977  | Parker     | 126/271 |
| 4,036,208 | 7/1977  | Bauer      | 126/271 |
| 4,043,318 | 8/1977  | Pei        | 126/271 |

Primary Examiner—Kenneth W. Sprague
Assistant Examiner—James C. Yeung
Attorney, Agent, or Firm—Raymond H. Quist; Allen E. Amgott

[57] ABSTRACT

An evacuated, double-walled, tubular housing contains a sheet metal fin which is biased against the inner tube. A metal tube carrying the fluid to be heated is placed in heat transfer relationship with the fin. A plurality of collectors can be placed in an array with the fluid carrying tubes the only connection.

7 Claims, 9 Drawing Figures

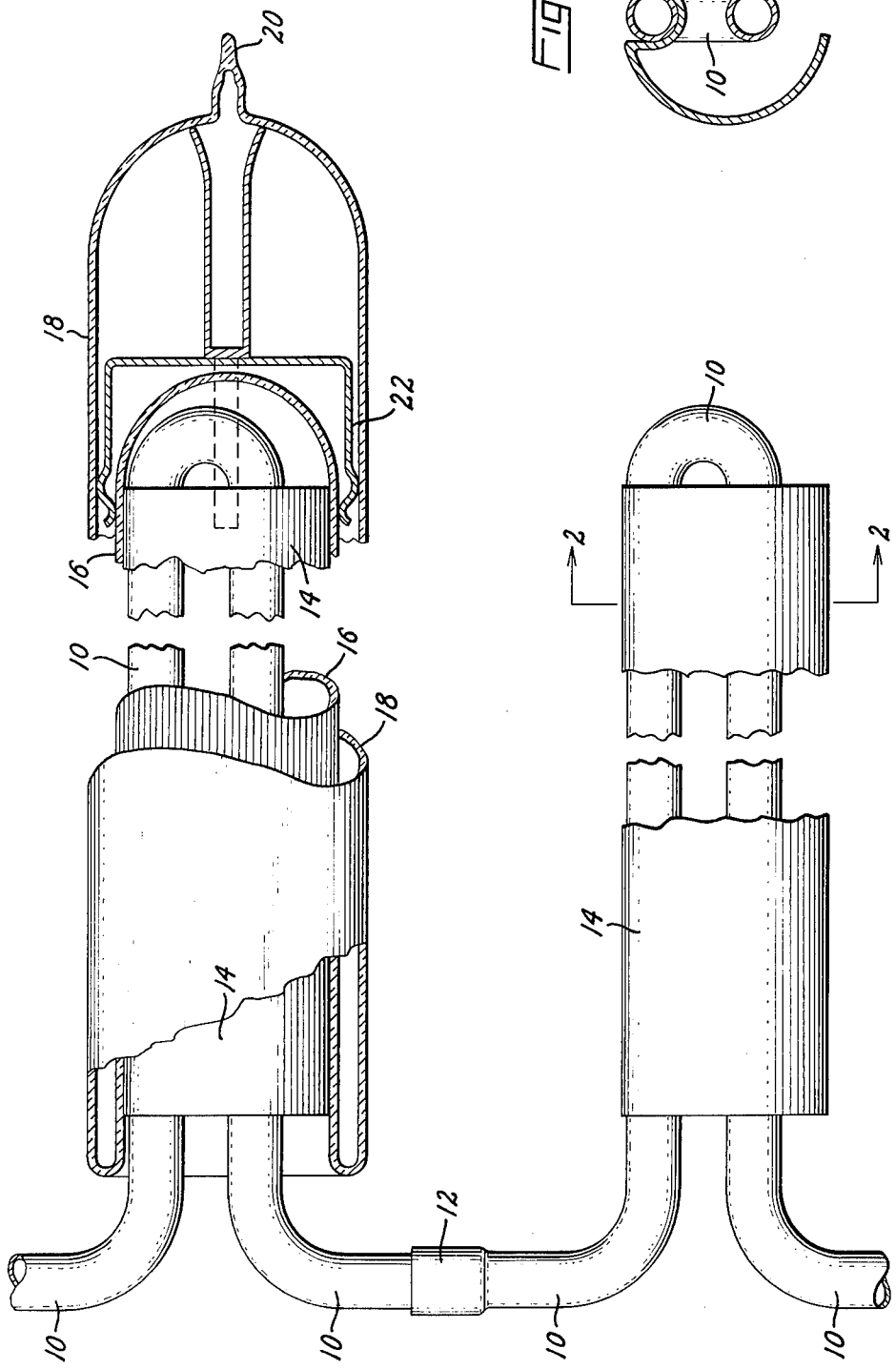
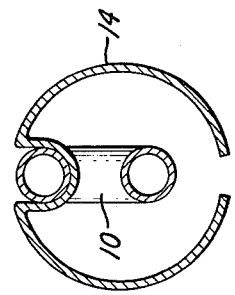

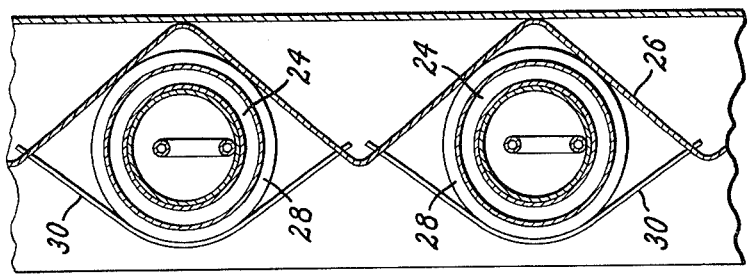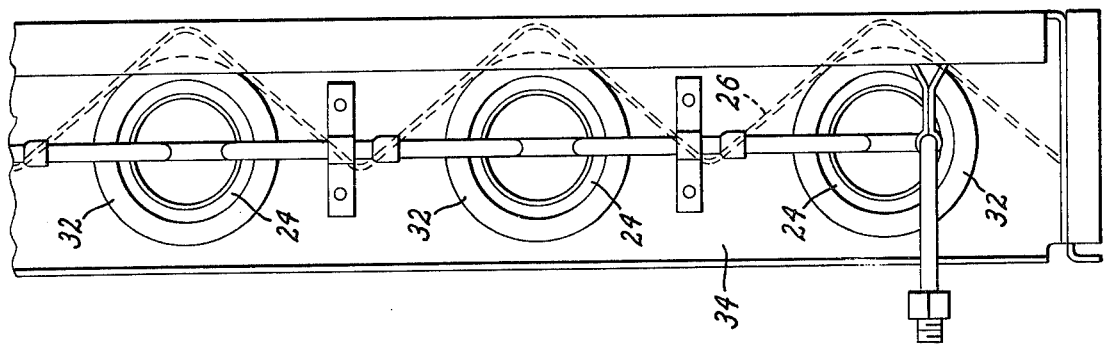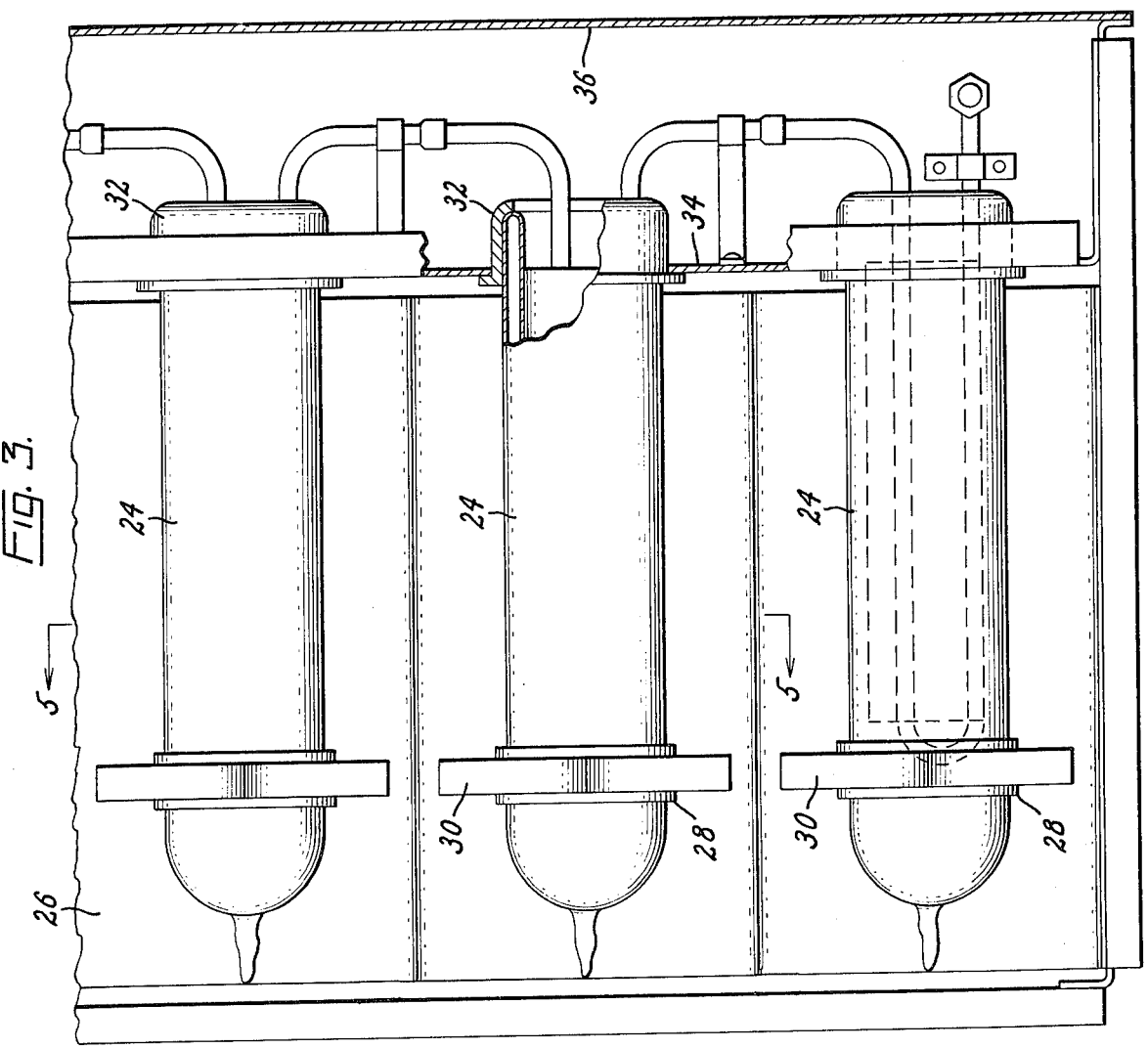

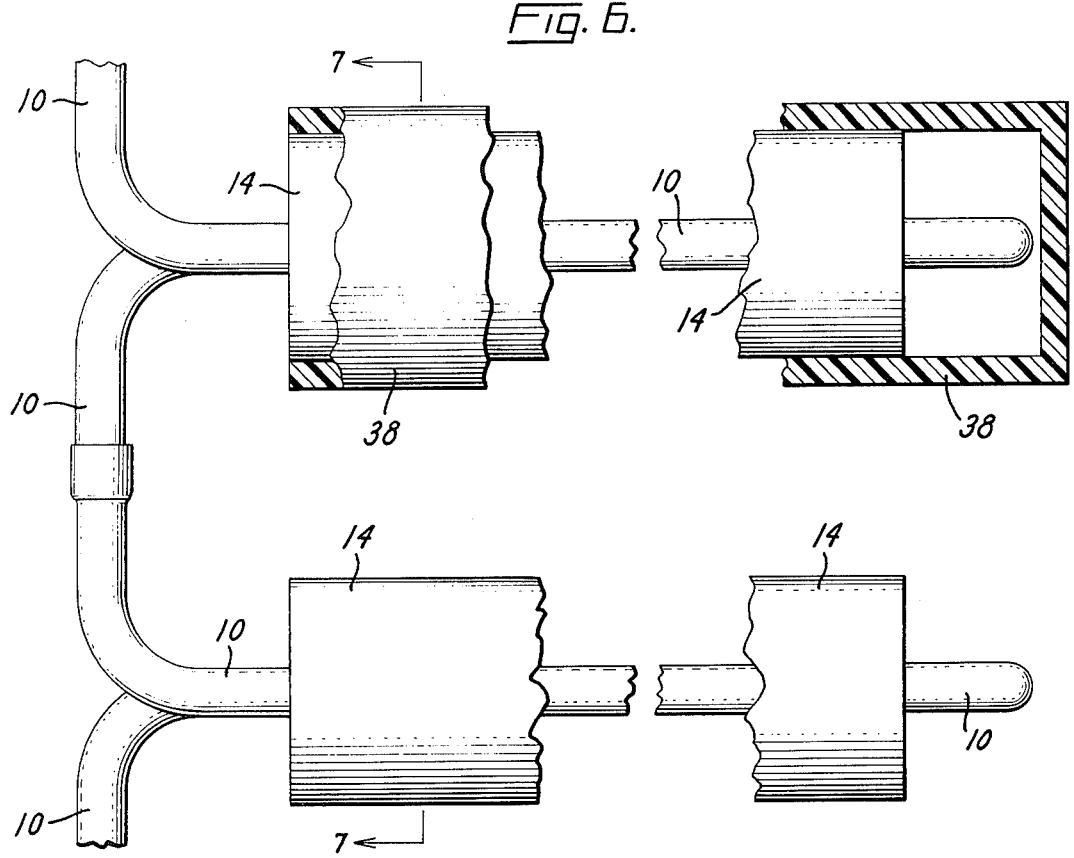
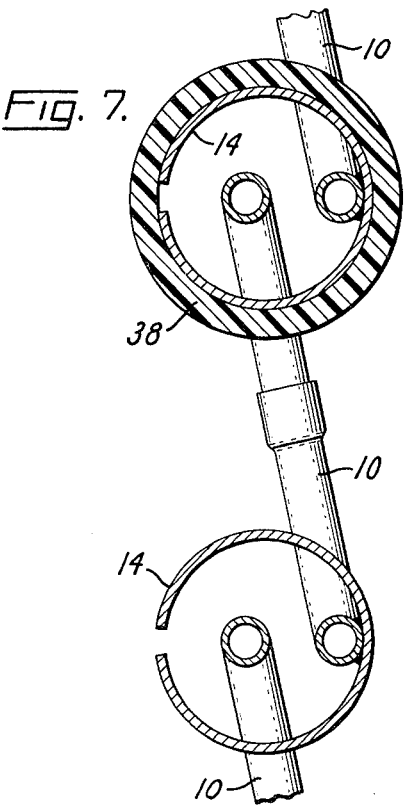
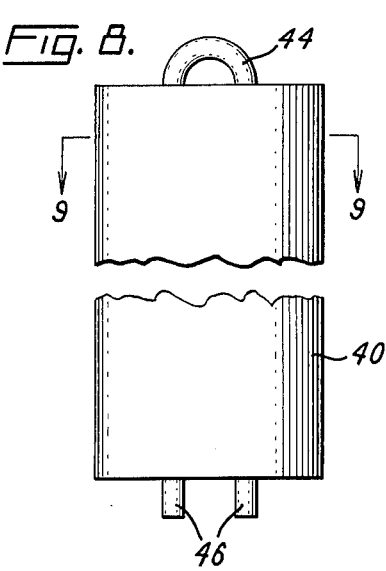
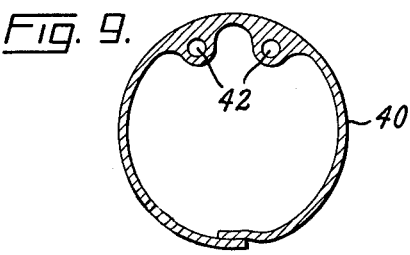

TUBULAR SOLAR COLLECTOR

BACKGROUND OF THE INVENTION

This invention relates generally to solar collectors and more particularly the type where each unit has a tubular housing configuration.

Efforts to achieve a useful conversion of solar energy into a more readily useable energy form have been intensified as the cost of other forms of useful energy has increased. The economics of the apparatus to be used, as well as any maintenance costs are major considerations in the choice of solar collector designs.

It is well known that a portion of the electromagnetic radiation received from the sun will pass through transparent materials such as glass, and will then heat an opaque object positioned behind the glass. Commonly the space between the transparent material and the object is evacuated to prevent heat loss by gaseous conduction and convection. U.S. Pat. No. 980,505 (Emmet) shows such arrangements as does U.S. Pat. No. 2,460,482 (Abbot). These patents disclose a tubular double-wall construction with a fluid within the inner tube. In the Abbot patent it is further proposed to coat the outer surface of the inner tube with a material highly absorbent of solar rays (see column 5, line 67 et seq).

When, as is frequently the case, it is desired to use a liquid as the medium to be heated, problems of liquid compatibility, as well as degradation of such organic components as gaskets and hoses used to contain the liquid have developed. Portions of the apparatus will also undergo cycles of expansion and contraction as the solar insolation changes which has resulted in breakage due to fatigue or poor design.

By combining a tube structure such as disclosed in FIG. 8 of the Emmet Patent with a coating on the outside of the inner tube as suggested by Abbot, a good beginning to a workable tubular solar collector is achieved.

More recently, U.S. Pat. No. 3,952,724 (Pei) while using an evacuated double-walled tubular housing such as above, proposed using a third tube to carry fluid into the inner end of the housing from which it can flow along the inside of the inner tube as disclosed by Abbot. This type of structure has the problem of loss of the total system fluid should any one of the tubular housings be broken. In addition, inlet and outlet manifolds are employed to which each collector must be joined in a fluid tight seal, with each seal a potential leakage point.

SUMMARY

An evacuated, double-walled, tubular housing has a transparent outer wall. Contained within and essentially co-extensive with said housing is a sheet metal fin biased against the inner wall of the housing. Means such as a tube is provided to convey fluid in good heat transfer relationship with said fin. The fluid conveying means has both its inlet and outlet at the same end of the tubular housing.

BRIEF DESCRIPTION OF THE DRAWINGS

FIG. 1 shows the fin and tube arrangement of this invention both with and without a tubular housing, partially broken away;

FIG. 2 is cross-section of a portion of FIG. 1;

FIG. 3 is a plan view of a portion of an array of tubular solar collectors;

FIG. 4 is an end view of FIG. 3;

FIG. 5 is a cross-section of a portion of FIG. 3;

FIG. 6 is an alternate embodiment of the FIG. 1 arragement;

FIG. 7 is a cross-section of FIG. 6;

FIG. 8 shows an alternate fin and fluid conveying means; and

FIG. 9 is a cross-section of FIG. 8.

DESCRIPTION OF THE PREFERRED EMBODIMENT

Referring to FIG. 1 the upper portion shows a complete solar collector element while the lower portion has the tubular housing removed. Tube 10 which is preferably of a metal such as copper is provided to carry a fluid which is to be heated with the heat derived from solar radiation. By use of joints 12 formed by common plumbing techniques such as sweating, a plurality of tubes 10 from separate solar collector elements can be joined into a single leak-free conduit. (This concept is disclosed in FIG. 4 of U.S. Pat. No. 3,227,153.) This arrangement overcomes the leakage problems which have been experienced in solar collector devices when organic materials in the form of hoses have been utilized.

As shown in FIGS. 1 and 2, tube 10 has a U-shaped configuration within each of the separate solar collector elements. In accordance with the invention, the upper leg of the U (as viewed in the drawings) is in heat transfer relationship with a curved sheet metal member 14 (which will hereafter be called a fin). In the arrangement shown in FIG. 2, fin 14 is formed with a channel to receive the upper leg of tube 10. As shown in FIG. 7, however, fin 14 may extend about the total U-shaped configuration. Common expedients to enhance the thermal contract between fin 14 and tube 10 may be employed such as bonding them together by welding or flashing.

Illustrated in the upper portion of FIG. 1 are inner and outer tubes 16 and 18, respectively. At the left end, tubes 16 and 18 are fused together; however, at the right end these tubes are not joined to each other. This arrangement is preferred where it is expected that the inner tube may elongate a greater amount than the outer tube because of differences in their temperatures.

The space between the two tubes is evacuated to minimize heat transfer from the inner tube to the outer tube. The tip 20 of the outer tube is then pinched off. If desired, a getter may be included in the evacuated volume to absorb any residual gases or outgassing which occurs. A spacer arrangement 22 is provided in this embodiment to maintain the spaced relationship of the right ends of the inner and outer tubes.

In order to maximize the heat transfer from inner tube 16 to fin 14, fin 14 is manufactured to have a somewhat larger outside diameter than the inside diameter of tube 16. When the inner and outer tube combination is then slid over fin 14, fin 14 will be biased against the inner wall of the inner tube. Obviously, fin 14 is made as long as possible so as to receive the maximum insolation.

Outer tube 18 is transparent and is preferably a glass such as borosilicate or soda lime. Inner tube 16 may be of the same material; however, its outer surface preferably has a coating with a high absorbtivity and low emissivity or high $\alpha/\epsilon$ ratio to maximize the amount of radiation which will be absorbed as heat by tube 16 and conducted through it to fin 14 and tube 10 thereby heating the fluid within tube 10.

FIG. 3 shows a portion of an array of solar collector elements 24. It should be noted that the drawings are not to scale. Dimensions such as the length of the tubular housing are not critical and may be chosen for various reasons such as the commercial availability of a tube already being fabricated for another purpose (such as flourescent lights). Corrugated radiation reflector 26, as best seen in FIGS. 4 and 5 supports solar collector elements 24 as well as reflecting solar radiation back upon them. Reflector 26 may be of any material having a mirror like surface. Cushions 28 (FIG. 5) surround solar collector elements 24 at the left end and may be adhesively secured thereto. Cushions 28 may be foam rubber or the like. Band 30, which may be metal, holds down the left ends of solar collector elements 24, while end protectors 32, which may be of any moldable and flexible material, support the right ends of the tubes in inner wall 34 of container 36. While container 36 is not shown as having a cover, General Electric Company's LEXAN*, a polycarbonate resin sheet, may be used as a cover to prevent breakage.

*Trademark of General Electric Company

FIGS. 6 and 7 show that it is also possible to have tube 10 arranged so that the U-shaped configuration is vertical rather than horizontal as in FIGS. 1 and 3. Additionally, although not presently preferred, a tube 38 which is not of glass may be employed as part of the solar collector. A metal fiber reinforced carbon or other good heat conducting material is desirable.

In FIGS. 8 and 9 an alternate fin configuration is illustrated. Fin 40 is extruded with fluid conveying means 42 formed as an integral part. U-tube element 44 at one end and tubes 46 at the other end can be joined to fluid conveying means 42 to complete the fluid connections. It will also be noted in FIG. 9 that the ends of fin 40 may be overlapped if desired.

It will be noted that any thermal expansion or contraction of the housing relative to the fin and its tube 40 will not introduce stresses between the two since they are not rigidly connected to each other.

With the foregoing embodiments if one glass tubular housing should be broken the system can still operate although at reduced efficiency since the tubular housing is not a conduit for the fluid to be heated.

While particular embodiments of the invention have been illustrated and described, it will be obvious that changes and modifications can be made without departing from the spirit of the invention and the scope of the appended claims.

I claim:

1. In a solar collector having a cylindrical tubular housing closed at one end the improvement comprising:
   a cylindrical fin extending longitudinally in said housing substantially co-extensive with and in contact with said housing;
   means for conveying a fluid in heat transfer relationship with said fin; and
   said fin is biased against the inside of said housing by a biasing means wherein said biasing means is accomplished by making the unbiased outside diameter of said fin larger than the inside diameter of said housing.

2. In a solar collector having a cylindrical tubular housing closed at one end the improvement comprising:
   a cylindrical sheet metal member extending longitudinally in and co-extensive with said housing; and
   U-tube means for conveying a fluid in heat transfer relationship with said member.

3. In a solar collector having a cylindrical tubular housing closed at one end the improvement comprising:
   a cylindrical sheet metal member extending longitudinally in and co-extensive with said housing;
   U-tube means for conveying a fluid in heat transfer relationship with said member; and
   means for biasing said sheet metal member against the inner wall of said housing.

4. A solar collector in accordance with claim 3 wherein:
   said means for biasing is provided by making the unbiased outside diameter of said cylindrical sheet metal member larger than the inside diameter of said housing.

5. A solar collector array comprising:
   a plurality of cylindrical tubular housings closed at one end and positioned side by side in a container having its upper side transparent to at least a portion of the electromagnetic radiation spectrum;
   reflecting means positioned beneath said tubular housings so as to reflect radiation onto said housings;
   a cylindrical sheet metal member contained in each of said housings and extending longitudinally in contact with said housings;
   a fluid containing tube in heat transfer relationship with each of said members; and
   said fluid containing tubes being connected to form a single fluid flow path through said array.

6. An improved solar collector comprising:
   a first transparent cylindrical tube closed at one end and open at the other;
   a second cylindrical tube closed at one end and open at the other, contained in said first tube;
   said first and second tubes having their open ends hermetically sealed to each other to form a double-walled evacuated chamber therebetween;
   a cylindrical sheet metal member contained in said second tube and extending longitudinally in contact with said tube and co-extensive therewith;
   tubular means for conveying a fluid, said tubular means in heat transfer relationship with said member;
   a solar energy absorbing coating on the outer surface of said second tube;
   said coating having a high absorbtivity and a low emissivity;
   spacer means maintaining said first and second tubes in spaced relationship; and
   means connecting said cylindrical sheet metal member to said means for conveying a fluid.

7. An improved solar collector in accordance with claim 6 wherein:
   said tubular means for conveying a fluid is a U-tube.

* * * * *